United States Patent [19]
Kulkarni

[11] Patent Number: 6,099,757
[45] Date of Patent: Aug. 8, 2000

[54] TUNED CONDUCTIVE COATINGS AND BLENDS FROM INTRINISICALLY CONDUCTIVE POLYMERS AND PROCESSES FOR MAKING SAME

[75] Inventor: Vaman G. Kulkarni, Charlotte, N.C.

[73] Assignee: Americhem, Inc., Cuyahoga Falls, Ohio

[21] Appl. No.: 09/333,132

[22] Filed: Jun. 14, 1999

Related U.S. Application Data

[63] Continuation-in-part of application No. 08/690,598, Jul. 30, 1996, abandoned, which is a continuation-in-part of application No. 08/462,604, Jun. 5, 1995, abandoned.

[51] Int. Cl.[7] ................................................. H01B 1/20
[52] U.S. Cl. ............................................................ 252/500
[58] Field of Search ........................... 252/500; 528/210, 528/214, 422, 423, 424

[56] References Cited

U.S. PATENT DOCUMENTS

| | | | |
|---|---|---|---|
| H944 | 8/1991 | Wade, Jr. et al. | 252/500 |
| 4,052,493 | 10/1977 | Etchells | 264/49 |
| 4,061,827 | 12/1977 | Gould | 428/368 |
| 4,129,677 | 12/1978 | Boe | 428/372 |
| 4,526,706 | 7/1985 | Upson et al. | 252/500 |
| 4,604,427 | 8/1986 | Roberts et al. | 525/185 |
| 4,617,228 | 10/1986 | Newman et al. | 428/265 |
| 4,665,129 | 5/1987 | Naarmann et al. | 525/186 |
| 4,711,742 | 12/1987 | Jen et al. | 252/500 |
| 4,772,421 | 9/1988 | Ikenaga et al. | 252/500 |
| 4,828,756 | 5/1989 | Benton et al. | 252/518 |
| 4,855,361 | 8/1989 | Yaniger et al. | 525/436 |
| 4,935,164 | 6/1990 | Wessling et al. | 252/500 |
| 4,983,322 | 1/1991 | Elsenbaumer | 250/500 |
| 4,983,690 | 1/1991 | Cameron et al. | 525/436 |
| 5,006,278 | 4/1991 | Elsenbaumer | 427/385.5 |
| 5,021,193 | 6/1991 | Armes et al. | 252/500 |
| 5,034,463 | 7/1991 | Brokken-Zijp et al. | 525/185 |
| 5,079,096 | 1/1992 | Miyake et al. | 428/500 |
| 5,115,057 | 5/1992 | Ono et al. | 526/256 |
| 5,130,054 | 7/1992 | Jasne | 252/500 |
| 5,143,650 | 9/1992 | Gerace et al. | 252/511 |
| 5,160,457 | 11/1992 | Elsenbaumer | 252/500 |
| 5,217,649 | 6/1993 | Kulkarni et al. | 252/500 |
| 5,232,631 | 8/1993 | Cao et al. | 252/500 |
| 5,340,499 | 8/1994 | Kärnä et al. | 252/500 |
| 5,494,609 | 2/1996 | Jen et al. | 252/500 |
| 5,520,852 | 5/1996 | Ikkala et al. | 252/521 |
| 5,589,108 | 12/1996 | Shimizu et al. | 525/500 |

FOREIGN PATENT DOCUMENTS

| | | | |
|---|---|---|---|
| 0 421 814 A2 | 4/1991 | European Pat. Off. | H01B 1/12 |
| 61-127737 | of 0000 | Japan | C08J 3/20 |
| 2 214 511 | 9/1989 | United Kingdom | C08K 3/00 |
| WO 89/01694 | 2/1989 | WIPO | H01B 1/12 |
| WO 89/02155 | 3/1989 | WIPO | H01B 1/12 |
| WO 90/10297 | 9/1990 | WIPO | H01B 1/12 |

OTHER PUBLICATIONS

"An Electrically Conductive Plastic Composite Derived from Polypyrrole and Poly(vinyl Chloride)" by De Paoli et al. *Journal of Polymer Science: Polymer Chemistry Edition*, vol. 23, pp. 1687–1697 (1985).

"Conductive Textiles" by Gregory et al., Timken Research Corporation (Printed in the Netherlands), pp. C823–C835 (1989).

"Conducting Polymer Fibre Prepared by Melt–Spinning Method from Fusible Polythiophene Derivative" by Yoshino et al., *Polymer Communications* vol. 28, pp. 309–310 (1987).

"Electrically–Conductive Fibers of Polyaniline Spun from Solutions in Concentrated Sulfuric Acid" by Andreatta et al., *Synthetic Metals*, 26, pp. 383–389 (1988).

"Spectroscopic Studies of Polyaniline in Solution and in Spin–Cast Films" by Smith et al., *Synthetic Metals*, 32, pp. 263–281 (1989).

*Synthetic Metals* 55–57 Transparent Conductive Coatings (1993) 3780–3785.

*Synthetic Metals* 48 Counter–ion Induced Processibility of Conducting Polyaniline and of Conducting Polyblends of Polyaniline in Bulk Polymers (1992) 91.

*Synthetic Metals* 55–57 Counter–ion Induced Processibility of Conducting Polyanline (1993) 3514–3519.

*Applied Physics Letters* 60 Optical–Quality Transparent Electrodes (1992) 2711–2713.

Primary Examiner—Mark Kopec
Attorney, Agent, or Firm—Renner, Kenner, Greive, Bobak, Taylor & Weber

[57] ABSTRACT

A composition comprises a) from about 80 to 99.5 percent by weight of a functionalized film-forming polymer matrix; b) from about 0.5 to 20 percent by weight of an intrinsically conductive polymer dispersed in the matrix; wherein the functionalized film-forming matrix controls the electrical conductivity in the composition, within a range of less than 5 orders of magnitude from about $10^5$ to about $10^{10}$ ohm/square, and is selected from the group consisting of acyclic organic hydroxyl compounds, and acrylates and methacrylates, containing at least one functionality selected from the group consisting of urethanes, epoxies, glycols, hydroxyls, polyesters, ethoxylates and propoxylates. The present invention also provides processes for making a conductive coating or blend compositions.

19 Claims, No Drawings

TUNED CONDUCTIVE COATINGS AND BLENDS FROM INTRINISICALLY CONDUCTIVE POLYMERS AND PROCESSES FOR MAKING SAME

CROSS-REFERENCE TO RELATED APPLICATIONS

This application is a continuation-in-part of U.S. Ser. No. 08/690,598, filed Jul. 30, 1996 now abandoned which is, in turn, a continuation-in-part of U.S. Ser. No. 08/462,604, filed Jun. 5, 1995 (now abandoned).

TECHNICAL FIELD

This invention relates to conductive coatings and blends derived from intrinsically conductive polymers and film forming matrices. Specifically the invention relates to conductive coatings comprised of an intrinsically conductive polymer and a functionalized film-forming matrix that provides controlled surface resistances in the range of $10^5$ to about $10^{10}$ ohm/square to insulating preferably substrates when applied with thicknesses ranging from about 0.1 to 30 microns.

BACKGROUND OF THE INVENTION

Conductive coatings made by dispersion of intrinsically conductive polymers (ICPs) such as polyaniline that are significant for technical applications, are described in *Synthetic Metals* 55–57 (1993) 3780–3785. Such coatings, while offering good clarity, water and heat resistance are limited in the range of surface resistances that they can provide with present formulation technology, typically less than $1 \times 10^5$ ohm/square. With these formulations it is presently difficult to achieve surface resistances reproducibly within the range $10^5$ to $10^{10}$ ohm/square. The limiting factor in controlling the surface resistance arises from the nature of the percolation behavior of the conductive phase, and is common to other two-phase systems of a conductor in an insulating matrix, such as blends of intrinsically conductive polymers, carbon blacks, metal filled polymers, and the like in insulating polymeric matrices. In a two component system wherein a conductive component is dispersed in an insulating matrix, the conductivity of the resulting system remains unchanged until a critical volume fraction of the conductive phase is reached, at which point there is a sudden, very large increase in the bulk conductivity of the system. With further addition of the conductive component there is only marginal change in the conductivity of the system and the conductivity of the system is saturated. The critical volume fraction of conductive filler for the sudden onset of bulk conductivity is referred to as the "percolation threshold." Typically this occurs with a change of conductivity of about $10^{-12}$ to $10^{-5}$ S/cm within a change in volume fraction of the conductive phase of about 0.5 to 3 volume percent. With such a steep increase in conductivity with very small changes in volume fraction of conductive components, it is extremely difficult to reproducibly prepare controlled coatings in the thickness range of about 0.1 to 30 microns that provide the highly desired surface resistances in the electrostatic dissipation (ESD)/antistat range of $10^5$ to $10^{10}$ ohm/square. Thus, there is presently a limitation in the art for making coating formulation and blends that reproducibly and controllably provide surface resistances in the $10^5$ to $10^{10}$ ohm/square range on insulating substrates.

Blends with intrinsically conductive polymers, especially with dispersible intrinsically conductive polymers in the powdered form are described in U.S. Pat. No. 5,217,649 and PCT/E88/00798. The definitions and concepts described therein are also applicable to the present application and are, therefore, incorporated by reference herein, for such disclosure.

The term "intrinsically conductive polymer" refers to an organic polymer containing a highly conjugated backbone comprising double and triple bonds, aromatic rings, and in some cases heteroatoms such as nitrogen, sulfur, oxygen and the like, which also have been doped with electron donor or electron acceptor dopants to form a charge transfer complex having an electrical conductivity of at least about $1 \times 10^{-6}$ S/cm by the four-in-line probe method. Examples of such polymers are polyanilines, polypyrroles, polyacetylenes, polythiophenes, polyphenylenes, and the like.

With the rapid advancement in electronic data processing and communication systems, electronic components have increasingly become smaller and are inherently more sensitive to electrostatic discharge especially during manufacture, handling, and packaging. Thus, the demand for effective static discharge materials has become very acute. Plastics, which are preferred materials for packaging, are insulators with a surface resistance of greater than $10^{15}$ ohm/square and can generate charge by friction that is not effectively dissipated. When such plastics are used for packaging static sensitive materials, static charge buildup can result in an uncontrolled discharge and result in damage to the electronic component that is packaged. Also, uncontrolled discharge can be a safety hazard to the operator in some instances.

For effective controlled discharge protection, the ideal situation is one wherein the electrical charges are dissipated nearly as rapidly as they are generated. Thus, at any point there is no accumulation of charge on the surface of the plastic and, hence, no danger of hazardous electrostatic discharge. In order to do this effectively, the surface resistance of the packaging material should be less than about $1 \times 10^{10}$ ohm/square, preferably between $10^5$ and $10^{10}$ ohm/square, even under extreme climatic conditions.

Following is a discussion of the various materials for static discharge protection.

1. Antistatic agents such as quaternary ammonium compounds, ethoxylated amines, alkyl sulfonates, and such function by ionic conduction and are dependent on humidity. They typically provide surface resistances in the $10^{11}$ to $10^{12}$ ohm/square range when applied as thin surface coatings, and even under ideal conditions provide only about $10^{10}$ ohm/square. Further, there is a concern about their corrosive effect on electronic components. Thus, they fail to provide the necessary requirements for reliable electrostatic discharge protection.

2. Filled systems such as conductive carbon loaded polymers are capable of offering resistances lower than $10^{10}$ ohm/square, but suffer from the disadvantage that they are black and non-transparent. Further, sloughing is a common problem associated with conductive carbon compounds. Sloughing is the shedding or flaking of carbon particles from the blend upon friction. These flakes are conductive and can cause short circuits in electronic components. Owing to the nature of the common percolation behavior of conductive carbons in insulating polymer matrices, it is extremely difficult to control the surface resistance in the $10^5$ to $10^{10}$ ohm/square range with these compositions.

There recently has been a considerable amount of interest in processing of intrinsically conductive polymers, especially polyaniline. Practical products are being explored.

1. High conductivity coatings and films from polyaniline have been reported in *Synthetic Metals* 48, (1992) 91, Synthetic Metals 55–57 (1992), 3514–3519, and Applied Physics Letters 60 (1992), 2711. The process involves synthesizing doped polyaniline with hydrochloric acid, neutralizing to obtain the emeraldine base and protonating it again with another acid, in this case preferably camphor sulfonic acid in the presence of m-cresol. Coatings containing pure polyaniline with a high degree of optical transparency and extremely low surface resistances have been prepared. The application of these materials is limited to very few substrates that are resistant to attack by solvent (m-cresol), such as polyethylene terephthalate (PET) and glass. Commonly used plastics in electronic packaging, such as polyvinyl chloride (PVC), polyethylene terephthalate glycol (PETG), and polycarbonate, would be seriously damaged by solvent attack. In addition to the highly complex process by which they are made, a further disadvantage may be seen in the fact that some of the m-cresol remains in the conductive film and potential toxicological problems arise both during the process and later use. Further, it is not known whether the coatings are resistant to heat, water and common cleaning solvents.

2. U.S. Pat. No. 4,526,706 describes a process for preparing conductive latex compositions. The five step process involves dissolving polyaniline base in a water miscible organic solvent, forming a latex by dispersing hydrophobic loadable polymer particles in an aqueous continuous phase, blending the polyaniline and latex solutions, removing the organic solvent and finally, converting the polyaniline base loaded latex to the conductive polyaniline salt loaded latex by acidifying the latex with a suitable acid. The resulting latex can be coated on a polyester substrate with a surface resistance of $10^6$ to $10^9$ ohm/square. Despite the complicated process, the coating possessed fair transparency, but no data on heat and water/solvent resistance was provided.

In summary, the prior art discloses no simple and effective processes that are available for preparing conductive coatings that are transparent, have good water and heat resistance, and provide controlled surface resistances in the $10^5$ to $10^{10}$ ohm/square range that are widely suitable for ESD and antistat applications.

Therefore, there remains a need for conductive coatings that are commercially suitable for electrical and electronic applications, which provide controlled surface resistances in the range $10^5$ to $10^{10}$ ohm/square, are substantially transparent and resistant to water and common cleaning solvents such as alcohols, and can be processed by conventional application techniques such as gravure, spray, dip and other coating methods.

SUMMARY OF INVENTION

It is an object of the present invention is to provide conductive compositions with surface resistances in the $10^5$ to $10^{10}$ ohm/square range.

It is another object of the present invention to provide a technique for preparation of conductive coatings and blends with precise control of surface resistance in the $10^5$ to $10^{10}$ ohm/square range.

It is another object of the present invention to provide a technique for preparation of conductive coatings and blends from doped polyaniline with precise control of surface resistance in the $10^5$ to $10^{10}$ ohm/square range.

It is yet another object of the present invention to provide transparent conductive coatings that are suitable for coating on various plastic substrates using conventional coating techniques such as gravure coating, spray coating, dip coating and the like.

It is still another object of the present invention to provide transparent coatings for ESD and antistat applications that are resistant to heat, water and common cleaning solvents used in the electrical and electronic industry.

It is further another object of the present invention to provide a transparent conductive coating having electrical properties that are independent of humidity.

It is yet another object of the present invention to provide processes for making the coatings and blends of the present invention, and applying the coatings onto insulating substrates to provide reproducible and controlled surface resistances in the range $10^5$ to $10^{10}$ ohm/square.

It is yet another object of the present invention to provide coatings and blends of the present invention as antistatic and electrostatic dissipative finishes on insulating surfaces.

It is yet another object of the present invention to provide articles comprising the conductive coating formulations of the present invention.

It is yet another object of the present invention to provide coatings and blends of the current invention as corrosion prevention primers for ferrous metals.

In general, the present invention relates to a composition comprising a) from about 80 to about 99.5 percent by weight of a functionalized film forming polymer matrix, and b) from about 0.5 to about 20 percent by weight of an intrinsically conductive polymer dispersed in the matrix, wherein the functionalized film forming matrix controls the conductivity of the composition within a range of less than 5 orders of magnitude from about $10^5$ to $10^{10}$ ohm/square and is selected from the group consisting of acyclic organic hydroxyl compounds, and acrylates and methacrylates containing at least one functionality selected from the group consisting of urethanes, epoxies, glycols, hydroxyls, polyesters and ethoxylates and propoxylates.

The present invention also provides a composition comprising a) up to about 99.5 percent by weight of a film-forming matrix comprising blends of i) 0 to about 10 parts by weight of a film-forming polymer with ii) from about 90 to 100 parts by weight of a functionalized film-forming material, selected from the group consisting of acyclic organic hydroxyl compounds so as to provide 100 total parts by weight of the film-forming matrix, and b) from about 0.5 to about 20 percent by weight of an intrinsically conductive polymer dispersed in the matrix; wherein the functionalized film-forming material controls the conductivity in the composition within a range of less than 5 orders of magnitude from about $10^5$ to about $10^{10}$ ohm/square, and wherein the dried and cured composition has a conductivity greater than about $10^{-8}$ S/cm.

The present invention also provides a composition comprising a) up to about 99.5 percent by weight of a film-forming matrix comprising blends of i) 0 to about 50 parts by weight of a film-forming polymer with ii) about 50 to 100 parts by weight of a functionalized film-forming material so as to provide 100 total parts by weight of film-forming matrix, the material being selected from the group consisting of acrylates and methacrylates, including monomers, oligomers, polymer precursors and polymers thereof and mixtures thereof, wherein the acrylates and methacrylates contain at least one functionality selected from the group consisting of urethanes, epoxies, glycols, hydroxyls, polyesters, ethoxylates and propoxylates and b) from about 0.5 to about 20 percent by weight of an intrinsically conductive polymer dispersed in the polymer matrix; wherein the functionalized film-forming material controls the electrical conductivity in the composition within a range of less than 5 orders of magnitude from about $10^5$ to about $10^{10}$ ohm/square, and wherein the dried and cured composition has a conductivity greater than about $10^{-8}$ S/cm.

The present invention also provides a process for making a conductive coating or blend composition comprising preparing a dispersion of an intrinsically conductive polymer in a thermoplastic polymer matrix by mixing a) from about 0.5 to about 20 percent by weight of the intrinsically conductive polymer, and b) from about 80 to about 99.5 percent by weight of a functionalized film-forming matrix, wherein the matrix controls the electrical conductivity in the composition within a range of less than 5 orders of magnitude from about $10^5$ to about $10^{10}$ ohm/square, the matrix being selected from the group consisting of liquid and molten functionalized film-forming materials containing acyclic organic hydroxyl compounds and acrylates and methacrylates, including monomers, oligomers, polymer precursors and polymers thereof and mixtures thereof, functionalized with substituents selected from the group consisting of urethane, epoxy, glycol, hydroxyl, polyester, ethoxylate, and propoxylate, functionalities, and wherein the composition is polymerizable to form cured coatings and blends having surface resistances in the range of from about $10^5$ to about $10^{10}$ ohms/square.

The intrinsically conductive polymer is typically dispersed in the functionalized film forming polymer matrix that controls and allows for tuning the electrical conductivities in dried coatings and blends in the range of 1 S/cm to $3\times10^{-8}$ S/cm. Compositions of this invention provide coating formulations that give reproducible surface resistances to coated insulating substrates in the range $10^5$ to $10^{10}$ ohm/square with coating thicknesses preferably in the range of about 0.1 to 30 microns. Coating compositions of the present invention containing select conductive polymers further provide conductive coatings that have a high degree of optical transparency, and insensitivity to humidity, heat, cleaning solvents, and water.

Another aspect of this invention relates to the use of coatings and blends of the present invention as antistatic and electrostatic dissipative finishes on insulating surfaces. Coatings of the present invention are especially useful for the prevention of static buildup on devices, containers, and packaging used in the handling, manufacture, and storage of semiconductors, circuit boards, and other electronic devices sensitive to electrostatic discharges.

Another aspect of this invention relates to articles comprising the conductive coating formulations of the present invention. Useful articles include coated cathode ray tubes (CRTs) used for television sets, computer displays, and the like, wherein the transparent conductive coatings of the present invention provide antistatic and electrostatic dissipative properties to the viewing surface of these displays thereby preventing electrostatic buildup, dust collection, and eye strain resulting from the high electric fields generated from these devices. Other useful articles comprising coatings of the present invention include polyester, polyvinyl chloride, and polycarbonate packaging materials for semiconductor electronic components. Such coated articles provide the necessary electrostatic discharge protection needed during handling and storage of these components.

Another aspect of this invention relates to the use of coatings and blends of the current invention as corrosion prevention primers for ferrous metals. The functionalized film-forming resin offers improved adhesion to the metal substrate enabling the conductive polymer to intimately interact and passivate the metal.

Another aspect of this invention relates to the use of coatings and blends of the current invention as primers for insulating substrates, such as plastic in powder coating application. Powder coats are applied electrostatically. Insulating materials do not accept the coating well, but the antistatic properties provided by the compositions, provide uniform powder coatings.

DETAILED DESCRIPTION OF THE INVENTION

The conductive composition of this invention comprises two essential components. One of the essential components employed is a functionalized film forming polymer matrix. The film-forming polymer matrix includes at least a functionalized film forming material that controls the conductivity in the coating and blends. This functionalized film forming material may comprise 100 percent of the film-forming matrix or may be a significant ingredient comprising the matrix. That is, other non-functionalized film forming polymers can be used in conjunction with the functionalized film forming material to provide a film-forming matrix that is capable of controlling the conductivity in the conductive composition. Preferably, the matrix will include from about 5 to 100 parts by weight and, more preferably, from about 50 parts to 100 parts by weight, of the functionalized film forming material and from about 0 to about 95 and, more preferably, from 0 to about 50 parts by weight of the conventional film forming polymer, depending upon the material and polymer selected. Even more preferably, the matrix will include from about 90 to 100 parts by weight of the functionalized film forming material and from 0 to about 10 parts by weight of the non-functionalized film-forming polymer.

The functionalized film forming material can be a monomeric, oligomeric, or polymeric organic material. Preferred classes of functionalized film-forming material used to achieve tuned electrical properties include but are not limited to acyclic organic hydroxyl compounds, and acyclic acrylates and methacrylates. The acrylates and methacrylates may be monomers, oligomers, polymer precursors or polymers functionalized with urethanes, epoxies, glycols, polyertons, polyesters, hydroxyls, ethoxylates, and propoylates. This foregoing list of functionalities is provided for the purposes of example only and is by no means necessarily intended to be exhaustive.

As noted above, it will be appreciated that the amount of functionalized film-forming material employed in the composition must be an amount that is sufficient to control the conductivity in the conductive composition within a range of less than 5 orders of magnitude for compositions containing more than about 0.5 weight percent and less than 20 weight percent conductive polymer, regardless of whether the film-forming matrix is a blend of film-forming polymers and functionalized film-forming materials, or whether the film-forming matrix includes 100 percent of the functionalized film-forming material. That is, whether there is some film-forming polymer material or none, there will always be some functionalized film-forming material. More particularly, it depends upon the material selected, as will be discussed next.

Useful film forming polymers for the matrices of the present invention include thermoplastic polymers, solution processible polymers, thermoset polymers, and monomers, oligomers and polymers curable by heat, light, x-rays, gamma rays, microwave radiation, UV radiation, infrared radiation, corona discharge, electron beams, and the like. Essentially any conventional film-forming polymer can be employed.

Illustrative of the film forming polymers useful in the practice of this invention are:

poly(dienes) such as poly(butadiene), poly(isoprene), and poly(1-pentenylene);

polyolefins such as polyethylene, polypropylene, and the like;

polyacrylics and polyacrylic acids such as poly(benzyl acrylate), poly(butyl acrylate)(s), poly(2-cyanobutyl acrylate), poly(2-ethoxyethyl acrylate), poly(ethyl acrylate), poly(2-ethylhexyl acrylate), poly(fluoromethyl acrylate), poly-(5,5,6,6,7,7,7-heptafluoro-3-oxaheptyl acrylate), poly(heptafluoro-2-propyl acrylate), poly(heptyl acrylate), poly(hexyl acrylate), poly(isobornyl acrylate), poly(isopropyl acrylate), poly(3-methoxybutyl acrylate), poly(methyl acrylate), poly(nonyl acrylate), poly(octyl acrylate), poly(propyl acrylate), poly(p-tolyl acrylate), poly(acrylic acid) and derivatives and salts thereof;

polyacrylamides such as poly(acrylamide), poly(N-butylacrylamide), poly(N, N-dibutylacrylamide), poly(N-dodecylacrylamide), and poly(morpholylacrylamide);

polymethacrylic acids and poly(methacrylic acid esters) such as poly(benzyl methacrylate), poly(octyl methacrylate), poly(butyl methacrylate), poly(2-chloroethyl methacrylate), poly(2-cyanoethyl methacrylate), poly(dodecyl methacrylate), poly(2-ethylhexyl methacrylate), poly(ethyl methacrylate), poly(1,1,1-trifluoro-2-propyl methacrylate), poly(hexyl methacrylate), poly(2-hydroxyethyl methacrylate), poly(2-hydroxypropyl methacrylate), poly(isopropyl methacrylate), poly(methacrylic acid), poly(methyl methacrylate) in various forms such as, atactic, isotactic, syndiotactic, and heterotactic; and poly(propyl methacrylate);

polymethacrylamides such as poly(4-carboxyphenylmethacrylamide);

other alpha- and beta-substituted poly(acrylics) and poly(methacrylics) such as poly(butyl chloracrylate), poly(ethyl ethoxycarbonylmethacrylate), poly(methyl fluoroacrylate), and poly(methyl phenylacrylate);

polyvinyl ethers such as poly(butoxyethylene), poly(ethoxyethylene), poly-(ethylthioethylene), poly(dodecafluorobutoxyethylene), poly(2,2,2-trifluoroethoxytrifluoro-ethylene), poly(hexyloxyethylene), poly(methoxyethylene), and poly(2-methoxypropylene);

polyvinyl halides and poly(vinyl nitriles) such as poly(acrylonitrile), poly-(1,1-dichloroethylene), poly(chlorotrifluoroethylene), poly(1,1-dichloro-2-fluoroethylene), poly(1,1-difluoroethylene), poly(methacrylonitrile), poly(vinyl chloride), and poly(vinylidene chloride);

polyvinyl esters such as poly(vinyl acetate), poly(benzoyloxyethylene), poly(4-butyryloxybenxoyloxyethylene), poly(4-ethylbenzoyloxyethylene), poly[(trifluoroacetoxy)-ethylene], poly[(heptafluorobutyryloxy)ethylene], poly(formyloxyethylene), poly[(2-methoxy-benzoyloxy)ethylene], poly(pivaloyl-oxyethylene), and poly(propionyloxyethylene); and hydrolyzed or partially hydrolyzed versions thereof, such as poly(hydroxyethylene-co-acetoxy ethylene), poly(hydroxyethylene-co-formyloxyethylene), poly(vinyl alcohol), and the like;

other vinyl polymers, such as poly(vinylpyrrolidone) and the like;

hydroxyl containing polymers, such as poly(butylene alcohol), poly(propylene alcohol), poly(vinyl alcohol), poly(hydroxyethylene acrylate), and the like;

polystyrenes such as, poly(4-acetylstyrene), poly[3-(4-biphenylyl)styrene], poly(4-[(2-butoxyethoxy)methyl] styrene), poly(4-butoxymethylstyrene), poly(4-butoxystyrene), poly(4-butylstyrene), poly(4-chloro-2-methylstyrene), poly(2-chlorostyrene), poly(2,4-dichlorostyrene), poly(2-ethoxymethylstyrene), poly(4-ethoxystyrene), poly(3-ethylstyrene), poly(4-fluorostyrene), poly(perfluorostyrene), poly(4-hexylstyrene), poly[4-(2-hydroxyethoxymethyl)styrene], poly[4-(1-hydroxy-1-methylpropyl)styrene], poly(2-methoxymethylstyrene), poly(2-methoxystyrene), poly(alpha-methylstyrene), poly(2-methylstyrene), poly(4-methoxystyrene), poly(4-octanoylstyrene), poly(4-phenoxystyrene), poly(4-phenylstyrene), poly(4-propoxystyrene), and poly(styrene);

polyoxides such as poly(ethylene oxides), poly(tetrahydrofuran), poly(oxetanes), poly(oxybutadiene), poly[(oxychloromethyl)ethylene], poly(oxy-2-hydroxytrimethyleneoxy-1,4-phenylenemethylene-1,4-phenylene), poly(phenylene oxide), poly(oxy-2,6-dimethoxy-1,4-phenylene), and poly(oxy-1,3-phenylene);

polycarbonates such as polycarbonate of Bisphenol A, and poly-([oxycarbonyloxy-4,6-dimethyl]-1,2-phenylenemethylene-3,5-dimethyl-1,2-phenylene);

polyesters such as poly(ethylene terephthalate), poly[(1,2-diethoxycarbonyl)ethylene], poly[(1,2-dimethoxycarbonyl)ethylene], poly(oxy-2-butenyleneoxysebacoyl), poly[di-(oxyethylene) oxyadipoyl], poly(oxyethylene-oxycarbonyl-1,4-cyclohexylenecarbonyl), poly-(oxyethyleneoxyisophthaloyl), poly[di(oxyethylene) oxyoxalyl], poly[di(oxyethylene)-oxysuccinyl], poly(oxy-ethyleneoxyterephthaloyl), poly(oxy-1,4-phenyleneisopropylidene-1,4-phenyleneoxysebacoyl), and poly(oxy-1,3-phenyleneoxyisophthaloyl);

polyanhydrides such as poly(oxycarbonyl-1,4-phenylenemethylene-1,4-phenylene-carbonyl), poly(oxyisophthaloyl), poly(maleic anhydride), copolymers and hydrolyzed versions thereof;

polyurethanes such as poly(oxcarbonyliminohexamethylene-iminocarbonyl-oxydecamethylene), poly(oxyethyleneoxycarbonyliminio-hexamethylene-imino-carbonyl), poly(oxyethyleneoxycarbonylimino-1,4-phenylene-trimethylene-1,4-phenyleneiminocarbonyl), poly(oxydodecamethylene-oxycarbonyliminodeca-methyleneim inocarbonyl), and poly(oxytetramethylene-oxycarbonylimino-1,4-phenylenemethylene-1,4-phenyleneiminocarbonyl);

polysiloxanes such as poly(dimethylsiloxane), poly[oxy(methyl) phenylsilylene], and poly(oxydiphenylsilylene-1,3-phenylene);

polysulfones and poly(sulfonamides) such as poly[oxycarbonyidi(oxy-1,4-phenylene)sulfonyl-1,4-phenyleneoxy-1,4-phenylene], poly[oxy-1,4-phenylenesulfinyl-1,4-phenyleneoxy-1,4-phenylenecarb onyl-1,4-phenylene), poly(oxy-1,4-phenylenesulfonyl-1,4-phenylene), and poly(sulfonyl-1,3-cyclohexylene);

polyamides such as nylon-6, nylon-6,6, nylon-3, nylon-4,6, nylon-5,6, nylon-6,2, nylon-6,12, nylon-12, and poly(vinyl pyrrolidone);

polyimines such as poly(acetyliminoethylene), poly ethylenimine and poly(valeryl-iminoethylene);

polybenzimidazoles such as poly(2,6-benzimidazolediyl-6,2-benzimidazolediyloctamethylene);

carbohydrates such as amylose triacetate, cellulose triacetate, cellulose tridecanoate, ethyl cellulose methylcellulose, carboxymethylcellulose, hydroxyethylcellulose, and the like;

and polymer mixtures and copolymers thereof such as poly(acrylonitrile-co-styrene) with poly(e-caprolactone), or poly(ethyl methacrylate), or poly(methyl methacrylate);

poly(acrylonitrile-co-vinylidene chloride) with poly(hexamethylene terephthalate);

poly(allyl alcohol-co-styrene) with poly(butylene adipate), or poly(butylene sebacate); poly(n-amyl methacrylate) with poly(vinyl chloride);

bisphenol A polycarbonate with poly(e-caprolactone), or poly(ethylene adipate), or poly(ethylene terephthalate), or novolac resin;

poly(butadiene) with poly(isoprene);

poly(butadiene-co-styrene) with glycerol ester of hydrogenated rosin;

poly(butyl acrylate) with poly(chlorinated ethylene), or poly(vinyl chloride);

poly(butyl acrylate-co-methyl methacrylate) with poly(vinyl chloride);

poly(butyl methacrylate) with poly(vinyl chloride);

poly(butylene terephthalate) with poly(ethylene terephthalate), or poly(vinyl acetate-co-vinylidene chloride);

poly(e-caprolactone) with poly(chlorostyrene), or poly(vinyl acetate-co-vinylidene chloride);

cellulose acetate with poly(vinylidene chloride-co-styrene);

cellulose acetate-butyrate with poly(ethylene-co-vinyl acetate);

poly(chlorinated ethylene) with poly(methyl methacrylate);

poly(chlorinated vinyl chloride) with poly(n-butyl methacrylate), or poly(ethyl methacrylate), or poly(valerolactone);

poly(chloroprene) with poly(ethylene-co-methyl acrylate);

poly(2,6-dimethyl-1,4-phenylene oxide) with poly(a-methylstyrene-co styrene), or poly(styrene);

poly(ethyl acrylate) with poly(vinyl chloride-co-vinylidene chloride), or poly(vinyl chloride);

poly(ethyl methacrylate) with poly(vinyl chloride);

poly(ethylene oxide) with poly(methyl methacrylate);

poly(styrene) with poly(vinyl methyl ether); and poly(valerolactone) with poly(vinyl acetate-co-vinylidene chloride);

maleic anhydride copolymers, such as poly(maleic anhydride-co-ethylene), poly(maleic anhydride-co-styrene), and the like.

Other useful polymers are those cited above that additionally are functionalized with various groups that alter the processibility, solubility, surface tension, and other physical properties of the matrix.

The film-forming polymers may additionally be dissolved in or plasticized with a solvent. Useful solvents include aromatic, aliphatic, and functionalized aromatic and aliphatic solvents. Preferred solvents include xylene, toluene, acetone, diacetone alcohol, isopropanol, ethyl alcohol, and the like. Especially preferred solvents are those that are environmentally friendly. Where a solvent is utilized, amounts employed are 10 to 85 percent by weight, based upon total solids content, depending on the viscosity desired. The remaining components that provide 100 percent of the solids are hereinafter described. Whether produced from a blend or of only the functionalized material, 100 parts by weight of the film-forming matrix comprise up to 99.5 percent by weight of the solids of the composition of the present invention. When the matrix is provided in this manner, it is not readily quantified such as by weight percent, because the weight of the non-functionalized component of the material varies widely. Nevertheless, the amount employed can be identified in terms of an amount that is sufficient to control the conductivity in the conductive composition within a range of less than 5 orders of magnitude for compositions containing more than about 0.5 weight percent and less than 20 weight percent conductive polymer.

The second component employed in the practice of this invention is an intrinsically conductive polymer. Useful conductive polymers include polyanilines, such as those described in U.S. Pat. No. 5,160,457, polythiophenes, polypyrroles, polyisothionaphthalenes, polyphenylene vinylenes, polyarylene vinylenes such as those described in U.S Pat. No. 5,068,060, and substituted (functionalized) derivatives thereof. Preferred for the practice of this invention are conductive polymers comprising doped polyanilines. Especially preferred intrinsically conductive polymers are those selected from the class of doped polyanilines doped with sulfonic or phosphonic acids. Also preferred for the practice of this invention are intrinsically conductive polymers in the form of particulates with particle sizes ranging from about 0.005 to 100 microns. Especially preferred are those with particle sizes in the range of 0.005 to 0.5 microns.

In general, the amount of intrinsically conductive polymer used in the practice of this invention can vary widely and may depend on the intrinsic conductivity of the pure polymer. In the preferred embodiments of the invention, the amount of intrinsically conductive polymer employed is up to about to 20 weight percent, ranging from about 0.5 to 20 weight percent in the dried, cured coatings and blends. In especially preferred embodiments of the invention, the intrinsically conductive polymer comprises about 0.5 to 10 weight percent of the dried, cured coatings and blends. It is preferred that the intrinsically conductive polymer is incorporated into the coating in the form of a thermoplastic dispersion, as shown in FIG. 1.

Although not wishing to be bound by any theory, it is believed that these conductivity controlling materials disrupt the normal percolation behavior of the dispersed conductive polymers in the insulating film-forming polymer matrices, thereby causing only a gradual and continuous increase in the conductivity of the matrix as a function of the percent loading of the conductive phase in the mix. Compositions of the present invention show surprisingly broad percolation thresholds, and in some cases the disappearance of a percolation threshold, over a wide range of concentration of the intrinsically conductive polymer. This gradual increase in conductivity, as opposed to an abrupt rapid increase in conductivity is what provides for the reproducible control and tunability of conductivity in the coatings and blends providing surface resistances in the range $10^5$ to $10^{10}$ ohm/square.

In addition to the essential components, the compositions of this invention can include other optional components, the nature of which can vary widely, optionally including those materials which are known to those of skill in the art for inclusion in polymer articles and coatings. Such materials may be present which alter the physical or mechanical properties of the coating solutions, or articles and coatings eventually cast from the solutions. Materials may also be present which either fill or form a substrate for the conductive coatings cast from solution. Illustrative of useful optional materials include reinforcing fibers, inert fillers such as clays, micas, and silica particles, colorants and pigments, flame retardants, processing aids, dispersants, adhesion promoters, and the like. When the dispersion contains such additives, the amount of the film forming matrix is reduced by the amount corresponding to the amount of the additive.

Methods for formulating and processing compositions of this invention can vary widely and include solution and melt processing techniques. For example, compositions of this invention can be formed by heating and mixing a mixture of the various components to a temperature equal to or greater than the melting or softening point of at least one of the polymer components to form a molten intimate mixture of the essential components to which optional components may be added as desired. Thereafter the mixture can be formed into a desired article through the use of any conventional shape forming technique. For example, the molten mixture can be spread on a surface and allowed to cool forming a free standing film or film coating on substrates. The molten mixture can be extruded through a die to form films or fibers or injection molded into a suitable mold to form molded parts having the shape of the mold.

The manner in which the molten intimate mixture of essential components and optional components is formed is not critical and a variety of conventional methods can be employed. For example, the molten mixture can be formed through the use of conventional polymer and additive blending means, in which the polymeric components are heated to a temperature equal to or greater than the melting point of at least one of the polymers, and below the degradation temperature of each of the components. High shear or ultrasonication can be used to effect the desired level of dispersion. The order of mixing of the various components of the intimate mixture may not be critical. The desired amount of optional components in liquid or solid form can be added to the molten polymer mixture while vigorously agitating the melt by stirring, shearing, or irradiation with ultrasound, or they can be added prior to melting and mixing.

Compositions of this invention can also be prepared by a solution process, wherein a solution of the functionalized film-forming polymer matrix, or polymerizable monomers, or oligomers is formed. The desired essential and optional components in the desired amounts may be dissolved or dispersed in the solution. As noted previously, where a solvent is utilized, amounts employed are 10 to 85 percent by weight, based upon total solids content, depending on the viscosity desired. The invention also provides for use of a thermoplastic dispersion of the intrinsically conductive polymer for clarity and conductivity. That is, the intrinsically conductive polymer can be dispersed as insoluble particles in certain solvents. The dissolved and/or dispersed compositions of this invention can be solidified into desired shapes by removal of the solvent through use of conventional techniques, such as heat or air drying. For example, surface films of any desired thickness can be formed by removal of the solvent from a solution spread on a surface. Such thicknesses range from about 0.1 to 30 microns. The coatings can be cast as a thin film on a variety of plastics and other substrates, without affecting the properties of the substrate. The coatings can be applied by gravure, spray, spin and other conventional application techniques. Fibers and films can be made by extruding the solution through a die. Shaped articles can be formed by removing the solvent from solution in a mold.

When the film forming matrix comprises polymerizable monomers, oligomers or polymer precursors, such as acrylates or methacrylates, film formation is preferably brought about by heat and/or electromagnetic radiation. When a coating is formulated for UV radiation curing, the coating composition will contain photoinitiators and coinitiators. When the formulation contains such additives, the amount of the monomer, oligomer, or polymer precursor is reduced by the amount corresponding to the amount of the additive. Suitable amounts range from about two to 10 percent by weight, with six percent being preferred. Formulations for electron beam, x-ray, and gamma ray radiation curing do not normally contain photoinitiators. However, the formulations may optionally contain photoinitiators in amounts ranging from about one to eight percent by weight, for other benefits, again with an attendant decrease in the amount of monomer, oligomer or polymer employed to form the polymer matrix.

Conductive coatings of the present invention can also be applied by film-transfer techniques, wherein the conductive coating is cast onto a carrier substrate, such as a Mylar or stainless steel foil, then cured or partially cured, then transferred to the desired substrate by pressure rolling or other suitable means. By this process, the conductive coating is transferred from the carrier to the desired substrate material. Optionally, adhesives or other adhesion promoters may be used to adhere the conductive coatings to the substrates. Other such film transfer processes known to those skilled in the art are anticipated under the scope of the present invention.

The electrically conductive coatings and blends of the present invention, and articles comprising the coatings and blends, can be used for any purpose for which antistatic and electrostatic dissipative (ESD) materials are useful. Examples of articles useful in the practice of this invention include but are not limited to antistatic optically transparent or non-transparent packaging materials for electronic and semiconductor components, antistatic finishes for CRT screens, antistatic floor waxes and finishes, ESD coatings for aircraft bodies and canopies, ESD coatings for carpet fibers, and the like.

The coatings according to the present invention will display a surface resistance in the range of $10^5$ to $10^{10}$ ohm/square, independent of the function of humidity. Another characteristic of the present invention is that the tuned conductive coatings can be formulated as high solids, and in some cases, 100 percent solids thus making them environmentally friendly.

GENERAL EXPERIMENTAL

The invention will now be further described in detail by descriptions of specific demonstrations thereof. In the following examples and throughout this application, all parts and percentages are by weight.

EXAMPLE 1

A composition containing 40 grams of VERSICON™ (doped polyaniline made by Allied Signal, Buffalo, N.Y.), 35 grams of polymethyl methacrylate, 15 grams of butyrolactone, 5 grams each of sulfonamide plasticizer and an organic phosphate ester was processed on a two-roll mill. The resulting compound showed a conductivity of 27 S/cm, in the form of a flat sheet.

EXAMPLE 2

A composition containing 4.3 parts of the dispersion of Example 1, 45 parts of polymethyl methacrylate solution (45%) and 50.7 parts of xylene was prepared. A 1 mil wet coating of the above solution on a polyester film had a surface resistance of $9.0 \times 10^3$ ohm/square after drying. On varying the concentration of the composition from Example 1 from 2 to 6 percent in the blend, the surface resistance changed from $1 \times 10^{12}$ to $1 \times 10^2$ ohm/square, respectively.

EXAMPLE 3

A similar composition as in Example 2 containing a conductivity controlling material comprising a hydroxy functional acrylate was used instead of polymethyl methacrylate, and this formulation showed a surface resistance of $2.8 \times 10^6$ ohm/square (1 mil wet thickness on polyester). On varying the concentration of the dispersion from Example 1 in the blend from 2 to 6 percent, the surface resistance of dried cast coatings changed from $10^{10}$ to $10^5$ ohm/square, respectively.

EXAMPLE 4

A composition containing 4.3 parts of the dispersion from Example 1, 87.7 parts of ethoxylated nonylphenol acrylate, and 8 parts of a photoinitiator was prepared. A 1 mil wet coating of the above solution on a polyester film had a (dry) surface resistance of $1 \times 10^{10}$ ohm/square. On varying the concentration of the dispersion from Example 1 in the blend from 2 to 6 percent, the surface resistance of dried cast coatings changed from $1 \times 10^{12}$ to $1 \times 10^{10}$ ohm/square, respectively.

EXAMPLE 5

A composition containing 4.3 parts of the dispersion from Example 1, 87.7 parts of ethylene glycol dimethacrylate, and 8 parts of a photoinitiator was prepared. A 1 mil wet coating of the above solution on a polyester film after drying and curing had a surface resistance of $1 \times 10^8$ ohm/square. On varying the concentration of the dispersion from Example 1 in the blend from 2 to 6 percent, the surface resistance of dried and cured coatings changed from $1 \times 10^8$ to $1 \times 10^7$ ohm/square, respectively.

EXAMPLE 6

Compositions containing 8, 6, 4 and 2 parts of the dispersion from Example 1 in a trifunctional acrylate, OTA-480 from UCB Radcure, (a proprietary urethane) containing 8 parts of a photoinitiator system, showed surface resistances after UV curing of $1 \times 10^7$, $1 \times 10^7$, $1 \times 10^7$ and $1 \times 10^8$ ohm/square, respectively.

EXAMPLE 7

A composition containing 8.0 parts of the dispersion from Example 1, 84 parts of caprolactone acrylate, and 8 parts of a photoinitiator was prepared. 1 a mil draw-down on a polyester film showed a surface resistance of $1 \times 10^8$ ohm/square after drying and curing with UV radiation.

EXAMPLE 8

In this Example, the percolation behavior (conductivity vs loading) for a dispersion of electrically conductive polyaniline (PANI) in five different coating compositions was evaluated to determine effectiveness of the present invention, employing materials to control the electrical conductivity. The materials selected to formulate the coating compositions included: polymethyl methacrylate (designated PMMA), according to U.S. Pat. No. 5,494,609, owned by the Assignee of record; hydroxy functional acrylate (designated HFAC) and three additional acrylate systems (designated ACRYLATE 1–3). The use of PMMA constituted a control, while the other materials exemplified practice of the present invention. The results were tabulated and have been reported in Table I which also lists the content of doped polyaniline in the dried/cured film versus the surface resistance. The coatings were prepared by mixing the dispersion from Example 1 with various coating compositions. The surface resistivities were measured on dried/cured films for 1 mil wet drawn-downs. The PMMA coating was dried at 70° C. for 5 minutes. The hydroxy functional acrylate coating was dried at 125° C. for 20 minutes and the various acrylate formulations were cured using a photoinitiator and a UV source.

TABLE 1

PERCOLATION BEHAVIOR

| Weight % Pani in Film | PMMA | HFAC | ACRYLATE 1 | 2 | 3 |
|---|---|---|---|---|---|
| 6.6 | $9 \times 10^3$ | $1 \times 10^6$ | — | — | — |
| 6.0 | — | — | $1 \times 10^7$ | — | — |
| 5.28 | $3.3 \times 10^4$ | $3.6 \times 10^6$ | — | — | — |
| 4.62 | $8.4 \times 10^4$ | — | — | — | — |
| 4.32 | — | $1.4 \times 10^7$ | — | — | — |
| 4.00 | $6.5 \times 10^5$ | — | $1 \times 10^7$ | $1 \times 10^{10}$ | $1 \times 10^6$ |
| 3.53 | — | $1.2 \times 10^8$ | — | — | — |
| 3.30 | $1 \times 10^{12}$ | — | — | — | — |
| 3.2 | — | — | $1 \times 10^7$ | $1 \times 10^{10}$ | $1 \times 10^6$ |
| 2.84 | — | $6.5 \times 10^9$ | — | — | — |
| 2.40 | — | $1 \times 10^{12}$ | $1 \times 10^7$ | $1 \times 10^{10}$ | $1 \times 10^6$ |
| 1.6 | — | — | $1 \times 10^7$ | $1 \times 10^{10}$ | $1 \times 10^6$ |

As can be seen from the data provided in Table I, PMMA, the control, showed a sharp percolation behavior, seven orders of magnitude change over 0.7 weight percent polyaniline (3.3 to 4.0), and inability to control the surface resistivity in the preferred $10^5$ to $10^{10}$ ohms/sq range. On the contrary, the coating compositions of the present invention showed a broad percolation behavior (HFAC) and in some instances (ACRYLATE), total disappearance of percolation behavior and ability to control surface resistivity in the $10^5$ to $10^{10}$ ohms/sq range.

EXAMPLE 9

To various 100 part portions of the coating compositions of Example 2 were added 1, 1.5 and 2 parts of triethanol amine or 0.2 and 1 gram of ammonia to demonstrate addition of the conductivity controlling material after formation of the coating. The components were mixed well and then 1 mil wet coatings were applied onto a polyester sheet and dried at 70° C. for 5 minutes. The surface resistivites were measured immediately after drying and again after 24 hours. The results are tabulated in Table II.

TABLE II

| Additive | Quantity | Surface Resistivity (Ohms/square) | |
| --- | --- | --- | --- |
| | | 0 hours | 24 hours |
| Triethanol amine | 1 | $1.0 \times 10^7$ | $8.6 \times 10^6$ |
| | 1.5 | $3.2 \times 10^8$ | $2.4 \times 10^8$ |
| | 2.0 | $1.0 \times 10^{11}$ | $1.6 \times 10^{12}$ |
| Ammonia | 0.2 | $4.0 \times 10^5$ | $1.3 \times 10^6$ |
| | 1 | $1.1 \times 10^9$ | $9.3 \times 10^8$ |

Thus, it should be evident that the use of materials to control the electrical conductivity in compositions comprising film-forming matrices and intrinsically conductive polymers, according to the present invention, is highly effective in affecting the percolation behavior of such compositions. The invention provides that broad ranges of percolation are obtainable by the use of the materials disclosed and practice of the process. The invention can be practiced by adding a functionalized material to control the electrical conductivity, by blending such functionalized film-forming materials with other conventional film-forming polymers, or by using functionalized film-forming materials to form the matrix for the intrinsically conductive polymers. The compositions of the present invention can be employed as conductive materials as coatings on various substrates, as additives for corrosion prevention primers for ferrous metals and, as primers for insulating substrates, such as plastic, in powder coating applications.

Based upon the foregoing disclosure, it should now be apparent that the use of the conductivity controlling materials described herein will carry out the objects set forth hereinabove. It is, therefore, to be understood that any variations evident fall within the scope of the claimed invention and thus, the selection of specific component materials can be determined without departing from the spirit of the invention herein disclosed and described. In particular, compositions according to the present invention are not necessarily limited to those employing polyaniline as the intrinsically conductive polymer, or hydroxy functional acrylate and other acrylates as the conductivity controlling materials, the examples having been provided merely to demonstrate practice of the invention. Thus, the scope of the invention shall include all modifications and variations that may fall within the scope of the attached claims.

What is claimed is:

1. A composition comprising:
    a) from about 80 to 99.5 percent by weight of a functionalized film-forming polymer matrix; and
    b) from about 0.5 to 20 percent by weight of an intrinsically conductive polymer dispersed in said matrix;
    wherein the functionalized film-forming matrix controls the electrical conductivity in said composition within a range of less than 5 orders of magnitude from about $10^5$ to about $10^{10}$ ohm/square and is selected from the group consisting of acrylates and methacrylates containing at least one functionality selected from the group consisting of urethane, epoxy, glycol, hydroxyl, polyester, ethoxylates and propoxylates.

2. The composition of claim 1, which when applied to an insulating substrate in thicknesses ranging from about 0.1 to 30 microns, provides surfaces resistances to said insulating substrates in the range of from about $10^5$ to about $10^{10}$ ohm/square.

3. The composition of claim 1, wherein said intrinsically conductive polymer is selected from the group consisting of polyanilines, polythiophenes, polypyrroles, poly(phenylene vinylenes), poly(arylene vinylenes), poly(isothianaphthalenes), and substituted derivatives thereof.

4. The composition of claim 1, which additionally comprises processing aids, crosslinking aids, plasticizers, blowing agents, lubricants, surfactants, texturants, colorants, pigments, clays, micas, silicas, flame retardants, stabilizers, reinforcing fibers, adhesion promoters and mixtures thereof.

5. The composition of claim 1, which additionally comprises an organic solvent.

6. The composition of claim 1, wherein said conductivity controlling polymer matrix provides a means of controlling the electrical conductivity of said composition within a range of less than 5 orders of magnitude from $10^5$ to about $10^{10}$ ohms/square, for compositions containing 1 to 10 percent by weight of said conductive polymer.

7. The composition of claim 1, wherein said conductivity controlling polymer matrix provides a means of controlling the electrical conductivity of said composition within a range of less than 3 orders of magnitude from $10^5$ to about $10^{10}$ ohms/square, for compositions containing 1 to 8 percent by weight of said conductive polymer.

8. The composition of claim 1, which further comprises a polymerization initiator selected from the group consisting of photoinitiators and thermal initiators.

9. The composition of claim 1, which is curable with high energy radiation electron beams, X-rays, UV radiation, microwave radiation, infrared radiation, corona discharge, gamma rays and heat.

10. A composition comprising:
    a) up to about 99.5 percent by weight of a film-forming matrix comprising blends of i) 0 to 50 parts by weight of a film-forming polymer with ii) about 50 to 100 parts by weight of a functionalized film-forming material so as to provide 100 total parts by weight of film-forming matrix, said material being selected from the group consisting of acrylates and methacrylates, including monomers, oligomers, polymer precursors and polymers thereof and mixtures thereof, wherein the acrylates and methacrylates contain at least one functionality selected from the group consisting of urethane, epoxy, glycol, hydroxyl, polyester, ethoxylates and propoxylates; and
    b) from about 0.5 to about 20 percent by weight of an intrinsically conductive polymer dispersed in said polymer matrix;
    wherein said functionalized film-forming material controls the electrical conductivity in said composition within a range of less than 5 orders of magnitude from about $10^5$ to about $10^{10}$ ohm/square, and wherein the dried and cured composition has a conductivity greater than about $10^{-8}$ S/cm.

11. The composition of claim 10, which when applied to an insulating substrate in thicknesses ranging from about 0.1 to 30 microns, provides surfaces resistances to said insulating substrates in the range of from about $10^5$ to about $10^{10}$ ohm/square.

12. The composition of claim 10, wherein the film-forming polymer is selected from the group consisting of polyolefins, polydienes, polyacrylics, polyacrylic acids, polyacrylamides, polymethacrylic acids, poly(methacrylic acid esters), poly(methacrylamides), polyvinyl ethers, polyvinyl halides, poly(vinyl nitriles), polyvinyl esters, hydroxy containing polymers, polyvinyl pyrrolidone, polystyrenes, polyoxides, polycarbonates, polyesters, polyanhydrides, polyurethanes, polysiloxanes, polysulfones, poly(sulfonamides), polyamides, polyimines, polybenzimidazoles, carbohydrates, and polymer mixtures and copolymers derived therefrom.

13. The composition of claim 10, wherein said intrinsically conductive polymer is selected from the group consisting of polyanilines, polythiophenes, polypyrroles, poly(phenylene vinylenes), poly(arylene vinylenes), poly(isothianaphthalenes), and substituted derivatives thereof.

14. The composition of claim 10, which additionally comprises processing aids, crosslinking aids, plasticizers, blowing agents, lubricants, surfactants, texturants, colorants, pigments, clays, micas, silicas, flame retardants, stabilizers, reinforcing fibers, adhesion promoters and mixtures thereof.

15. The composition of claim 10, which additionally comprises an organic solvent.

16. The composition of claim 10, further comprising a polymerization initiator selected form the group consisting of photoinitiators and thermal initiators.

17. The composition of claim 10, which further comprises a polymerization initiator selected from the group consisting of photoinitiators and thermal initiators.

18. The composition of claim 10, which is curable with high energy radiation electron beams, X-rays, UV radiation, microwave radiation, infrared radiation, corona discharge, gamma rays and heat.

19. A process for making a conductive coating or blend composition comprising:

preparing a dispersion of an intrinsically conductive polymer in a thermoplastic polymer matrix and mixing
  a) from about 0.5 to 20 percent by weight of said dispersion of said intrinsically conductive polymer in said thermoplastic polymer matrix; and
  b) from about 80 to 99.5 percent by weight of a functionalized film-forming polymer matrix;
wherein the said film-forming polymer matrix controls the conductivity in said composition within a range of less than 5 orders of magnitude from about $10^5$ to about $10^{10}$ ohm/square, the matrix being selected from the group consisting of liquid and molten functionalized film-forming materials containing acrylates and methacrylates, including monomers, oligomers, polymer precursors and polymers thereof and mixtures thereof, functionalized with substituents selected from the group consisting of urethane, epoxy, glycol, hydroxyl, polyester, ethoxylate and propoxylate functionalities, and wherein said composition is polymerizable to form cured coatings and blends having surface resistances in the range of from about $10^5$ to about $10^{10}$ ohms/square.

* * * * *